Jan. 2, 1968
W. H. McCURDY ET AL
3,361,922
CATHODE GRID ASSEMBLY WITH MEANS FOR PREVENTING THE FORMATION
OF ELECTRON EMISSIVE MATERIALS UPON THE GRID ELEMENT
Filed May 24, 1965
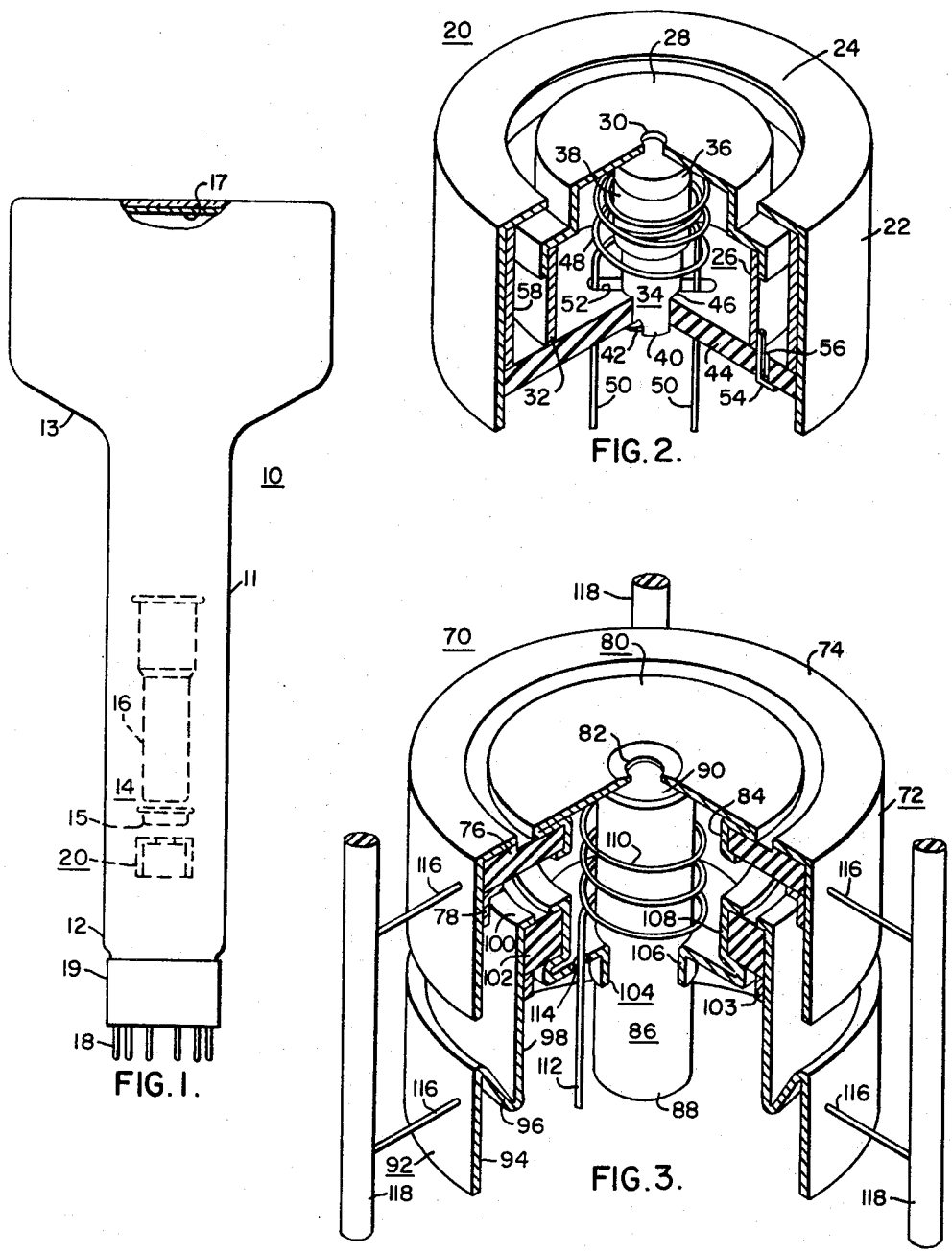
WITNESSES:
Bernard R. Gieguey
R. Lewis Gable
INVENTORS
William H. McCurdy &
Joel H. Fink.
BY
Charles F. Renz
ATTORNEY

United States Patent Office 3,361,922
Patented Jan. 2, 1968

3,361,922
CATHODE-GRID ASSEMBLY WITH MEANS FOR PREVENTING THE FORMATION OF ELECTRON EMISSIVE MATERIALS UPON THE GRID ELEMENT
William H. McCurdy, Pittsburgh, and Joel H. Fink, Pitcairn, Pa., assignors to Westinghouse Electric Corporation, Pittsburgh, Pa., a corporation of Pennsylvania
Filed May 24, 1965, Ser. No. 458,076
1 Claim. (Cl. 313—179)

ABSTRACT OF THE DISCLOSURE

This invention relates to cathode-grid assemblies and includes in one illustrative embodiment a cathode element made of material capable of emitting electrons, and a control element or grid having a surface exposed to the sputtered particles of the cathode material. The exposed surface of the control-grid is made of a material such as titanium or tantalum which has a greater affinity for the contaminant particles within the electron discharge device than the cathode materials. A suitable heater element is disposed, typically between the cathode and control elements, to thermally excite the cathode element to emit electrons and to heat the control element to such a temperature that the cathode particles are "evaporated" to thereby prevent the formation of compounds of the contaminants and the cathode particles.

---

This invention relates to improved electron discharge devices and more particularly to cathode-grid assemblies which may be incorporated in such devices.

The problem of electron emission from grid elements has long been recognized in the art. It is typically desired to minimize the emission of electrons from the grid element because the electron emission establishes current through the grid element. As is well recognized in the art, an impedance is presented by the associated circuitry of the electron discharge device to the grid element; if current is drawn by the grid element, an undesired potential will be established upon the grid element with respect to the other elements of the device. Therefore, it is desired to reduce the electron emission from the grid element and the resultant, undesired current drawn through the grid element.

The emission of electrons from a grid element is dependent upon two factors. First, it is necessary to create a surface of the grid element with a low work function and, secondly, it is necessary to heat the grid element to a sufficient temperature to sustain significant electron emission. A solution of this problem as suggested by the prior art is to maintain the grid element at a temperature below that necessary to sustain electron emission. Typically, this may be accomplished by providing the grid element with radiators or by blackening the surface of the grid element. In the alternative, heat shields may be provided between the heater element for the cathode and the grid element, or the grid element may be spaced from the heater element a sufficient distance to prevent the heating of the grid element.

A further problem recognized in the art relates to the emission of materials by the cathode element and their subsequent deposition on the grid element. The emitted materials typically react with the impurities found on the grid element to form an electron emissive substance. To inhibit this process grid elements must be kept especially clean and are often silver or gold plated to prevent oxides from reacting with cathode material which may be deposited on the grid element.

In many of the new types of high current density cathode assemblies, it has been found difficult if not impossible to maintain the grid element at a cool temperature. It may be understood that these cathode elements may often be operated at temperatures above 1,000° C. Further, it is frequently necessary to space the grid elements for these assemblies very closely to the cathode elements thus aggravating these problems further.

It is therefore an object of the present invention to provide an improved electron discharge device.

Another object of this invention is to provide an improved electron discharge device having therein a grid element from which electron emission has been substantially impeded.

A further object of this invention is to provide an improved cathode-grid assembly which may be operated at a high temperature and wherein a close cathode to grid spacing may be achieved without the emission of electrons of the grid element.

A still further object of this invention is to provide an improved cathode-grid assembly wherein those materials thrown off by cathode elements are substantially prevented from depositing upon the grid element.

Briefly, the present invention accomplishes the above cited objects by providing a cathode-grid assembly for an electron discharge device in which the heater element is disposed to thermally excite both the electron emissive cathode element and the grid element. Further, the grid element is made of a continuous getter type material which has the property of absorbing impurities when energized by the heater element. In one specific embodiment, the heater element is disposed about the cathode element and a cup-shaped grid element which is made of a material such as titanium is disposed in thermal relation about the heater element.

Further objects and advantages of the invention will become apparent as the following description proceeds and features of novelty which characterize the invention will be pointed out in particularity in the claim annexed to and forming a part of the specification.

For a better understanding of the invention reference may be had to the accompanying drawings, in which:

FIG. 1 illustrates an electron discharge device embodying the teachings of this invention; and FIGS. 2 and 3 present sectioned, perspective views of cathode-grid assemblies which may be incorporated into the electron discharge device of FIG. 1.

Referring now to the drawings and in particular to FIG. 1, there is shown a cathode ray device 10 as a specific embodiment of this invention. The cathode ray device 10 comprises an evacuated envelope 11 made of a suitable material such as glass and having an elongated portion 12 and a flared portion 13. An electron gun 14 is mounted axially within the elongated portion 12 so that a beam of electrons emitted from the electron gun 14 will strike a display target 17 coated upon the enclosed end of the envelope 12. The elongated portion 12 of the envelope 11 is enclosed by a base 19 through which a plurality of terminals 18 are mounted for providing electrical signals to the various elements within the envelope 11. The electron gun 14 includes accelerating and focusing elements 15 and 16, and a cathode-grid assembly 20. A deflection means (not shown) of either of the electromagnetic or electrostatic variety may be mounted outside or inside the envelope 11 so as to control the deflection of the electron beam emitted from the electron gun 14.

Referring now to FIG. 2, an illustrative embodiment of the cathode-grid assembly 20 is shown in detail. The cathode-grid assembly 20 comprises a cylindrical outer housing 22 which has an inwardly turned flange 24 upon one end. A grid element 26 is disposed about the axis of the outer housing 22. The grid element 26 includes a grid end cap 28 which is disposed concentrically within the aperture formed by the flange 24, and a grid support sleeve 32 which is secured to the grid end cap 28 by any suitable method such as spot welding. A grid aperture 30 is disposed centrally of the grid end cap 28 so as to receive the flow of electrons emitted from a cathode assembly 34. The cathode assembly 34 includes a cylindrical cathode support sleeve 38 and an impregnated cathode element 36 which is secured within the cathode support sleeve 38 as by spot welding. In an illustrative embodiment of the cathode-grid assembly 20, the impregnated cathode element 36 may be made of a tungsten impregnated with a barium, strontium, calcium carbonate. Further, the cathode support sleeve 38, the grid support sleeve 32, and the outer housing 22 may be made of a suitable metallic material such as molybdenum. Further, both the cathode assembly 34 and the grid element 26 are supported upon a support plate 44 made of a suitable insulating material such as aluminum oxide. The cathode assembly 34 is axially mounted in the outer housing 22 within an aperture 46 of the plate 44. One end of the cathode-support sleeve 38 is so cut to provide a plurality of bent taps 42 which secure the cathode support sleeve 38 upon the support plate 44 and a plurality of terminal tabs 40 to which electrical connections may be made. The grid support sleeve 32 is secured to the plate 44 by L-shaped members 54 which are inserted through apertures 56 of plate 44 and attached as by spot welding to the surface of the grid support sleeve 32. Further, a non-inductive double wound heater element 48 is disposed about the cathode assembly 34 to radiate thermal energy onto the grid end cap 28 and onto the impregnated cathode element 36. The heater element 48 is provided with terminal leads 50 which extend through slots 52 within the plate 44. Finally, a cylindrical spacing member 58 of a suitable metallic material such as molybdenum is inserted between the support plate 44 and the flange 24 of the outer housing 22 to establish the spacing between these members.

It is an important aspect of this invention that the element forming the grid, i.e., the grid end cap 28, be made of a continuous gettering type material capable of sorption or chemical reaction with the various impurities within the envelope 11 to thereby eliminate their presence. During the operation of the cathode-grid assembly 20, pure barium will be emitted from the impregnated cathode element 36 and will have a tendency to deposit upon the grid end cap 28. If the barium remains in its pure form, it would immediately evaporate from the surface of the grid end cap 28 due to its very high vapor pressure and deposit upon a colder element within the envelope 11. However, if there are impurities such as the oil deposited thereon by human handling or metal oxides, the barium will chemically react with these impurities and form compounds whose vapor pressure is much less than that of the pure barium. These compounds of barium will not evaporate as readily from the grid end cap 28 and will remain upon this element. It is noted that one of the compounds formed would be barium oxide which when heated will produce an undesired electron emission. Thus, by making the grip end cap 28 of a continuous gettering material such as titanium or tantalum, the impurities will be chemically sorbed by the gettering material, and the cathode material thrown off by the impregnated cathode element 28 will be immediately evaporated from the surface of the grid end cap 28. It is noted that though the above discussion is related to the emission of barium from the cathode element, that other typical electron emissive material such as strontium and calcium will act in substantially the same manner. Both strontium and calcium have a high vapor pressure and react with the impurities upon the grid end cap 28; therefore, the use of a gettering material such as titanium would also prevent the formation of the low vapor pressure electron emissive compounds of these materials.

In the operation of the cathode-assembly described above, it is necessary to heat the grid element to a temperature sufficient to evaporate the materials thrown off by the cathode element from the grid element. For the specific cathode element described above, wherein there would be emitted barium, calcium and/or strontium, the grid element should be heated to a temperature in excess of 500° or in excess of that temperature which would prevent the build up of any foreign deposit from the cathode element. The maximum temperature to which the grid element may be heated is determined by the temperature at which the material of which the surface of the grid element is composed begins to thermionically emit electrons. For the illustrative example of a grid element having a surface of either titanium or tantalum, substantial thermionic emission begins above 1000° C.; therefore, the temperature of this grid element should be maintained at less than this temperature. Further, the temperature of the grid element should be sufficiently high to ensure that the gettering material may purge or clean the surface of the grid element. The resultant clean grid surface will prevent the formation of compounds of those rare earth metals which have low vapor pressure and emit electrons at low temperatures.

It is noted that this invention has a particular application, though not limited thereto, to those well known high efficiency cathode elements such as the "L" cathode, the matrix cathode or the impregnated cathode. The problem of grid emission associated with these cathodes is aggravated by the close spacing between the cathode and grid elements and by the high temperatures at which the cathode element is operated. Typically, the cathode element is maintained at approximately 1000° C. The heater element is operated at a temperature in excess of 1100° C. depending on the thermal efficiency of the cathode structure.

Referring now to FIG. 3, an alternative embodiment of a cathode-grid assembly 70 is shown in detail. The cathode-grid assembly 70 includes a first cylindrical housing 72 having a bent flange 74 extending radially inward from one end thereof. A grid element 80 is supported by the first cylindrical housing 72 as by an annular disc 76 made of a suitable insulating material such as aluminum oxide. The disc 76 is secured to the housing 72 by an L-shaped support member 78 which is in turn secured to the inner periphery of the housing 72 as by spot welding. The grid element 80 is held in place by an integral crimped portion 84 which is bent over the inner periphery of the annular disc 76. Centrally orientated in the grid element 80 is a grid aperture 82 which is aligned with a cathode assembly 86 to receive the flow of electrons emitted therefrom. The cathode assembly 86 includes a cylindrical cathode support sleeve 88, an impregnated cathode element 90 which is secured within one end of the cathode sleeve 88 as by spot welding. The cathode assembly 86 is disposed axially within a second cylindrical housing 92. The second cylindrical housing 92 comprises an outer portion 94, an inner portion 98 and a bent interconnecting portion 96. An annular disc 102 made of a suitable insulating material such as aluminum oxide is positioned upon the inner periphery of the portion 98 as by a bent flange 100 formed integrally with the housing 92 and a stop member 103 secured to the inner portion 98 of the housing 92 as by spot welding. A cathode holder 104 is disposed upon the inner periphery of the annular disc 102. In particular, the cathode holder 104 comprises a flared portion 108 which is bent about the inner periphery of the disc 102 and an inner connecting portion 106 which is secured to the cathode support sleeve 88 as by spot welding. A heater element 110 comprising a single wound helical coil is disposed about the cathode assembly 86 to radiate heat upon the cathode element 90 and upon the grid element 80. The heater element 110 has a pair of terminal leads 112 which extend through apertures 114 within the cathode holder 104 to provide external electrical connections. It is important that the heater element 110 does not directly contact the grid element 80 and thereby provide an electrical connection between the grid element and the cathode assembly.

Further, the first cylindrical housing 72 and the second cylindrical housing 92 are positioned with respect to each other as by a plurality of support rods 118 made of a suitable insulating material such as aluminum oxide or glass. The cylindrical housings 72 and 92 are each connected as by studs 116 to the support rods 118 to thereby be rigidly mounted with respect to each other. Typically, one end of the studs 116 may be welded to the cylindrical housings and the other end may be secured to the support rods as by fusing. It is noted that the illustrative embodiment shown in FIG. 3 requires less heat to energize the cathode element and in addition provides greater electrical insulation between the grid element and the cathode assembly. Further, since the grid element and the cathode element are independently suspended, there is less probability of forming a leakage path as by the deposition of evaporated materials, between the grid element and the cathode element.

Thus there has been shown and described a cathode-grid assembly for an electron discharge device wherein the emission of electrons from the grid element is substantially prevented. Though it has been the practice of the prior art to thermally isolate the grid element from the cathode element, this invention, in contradistinction, teaches the heating of the grid element. Further, the grid element is made of a material having the chemical property of reacting and/or reducing those chemical compounds which would emit electrons. In addition, those materials which are thrown off by the cathode element will not readily coat the grid element but will deposit on other cooler elements within the discharge device.

While there has been shown and described what are at present considered to be the preferred embodiments of the invention, modifications thereto will readily occur to those skilled in the art. It is not desired therefore, that the invention be limited to the specific arrangement shown and described and it is intended to cover any appended claims and all such modifications that fall within the true spirit and scope of the invention.

We claim as our invention:

1. A cathode-grid assembly for an electron discharge device comprising a cathode element for emitting a flow of electrons, a control grid having an aperture therein to receive said flow of electrons, said control grid having a surface exposed to the particles sputtered from said cathode element, said surface made of a material having greater affinity for the impurities of said electron discharge device than said sputtered particles from said cathode element, a first housing disposed about and supporting said control grid, a second housing disposed about and supporting said cathode element, a heater element disposed to thermally influence said cathode element and said control grid, and means for independently supporting said first and second housings from one another.

References Cited

UNITED STATES PATENTS 2,875,361   2/1959   Stone _____ 313—180
3,264,510   8/1966   Griffiths _____ 313—180

OTHER REFERENCES

W. H. Kohl: "Materials and Techniques for Electron Tubes," General Telephone and Electronics Technical Series, Reinhold Publishing Corporation, New York, N.Y., 1960 edition (second printing 1962) Patent Office Library TK6565 V3 K65, pp. 250, 251, 332 and 576.

ROBERT SEGAL, Primary Examiner.

JAMES W. LAWRENCE, DAVID J. GALVIN,
                                                Examiners.

V. LAFRANCHI, Assistant Examiner.